US008429909B2

(12) United States Patent

Heemskerk et al.

(10) Patent No.: US 8,429,909 B2

(45) Date of Patent: Apr. 30, 2013

(54) CONTROL SYSTEM AND METHOD FOR CONTROLLING AT LEAST TWO HYDRAULIC CONSUMERS

(75) Inventors: Edwin Heemskerk, Lohr (DE); Bernd Voelker, Eussenheim (DE)

(73) Assignee: Robert Bosch GmbH, Stuttgart (DE)

( * ) Notice: Subject to any disclaimer, the term of this patent is extended or adjusted under 35 U.S.C. 154(b) by 638 days.

(21) Appl. No.: 12/669,988

(22) PCT Filed: Jul. 7, 2008

(86) PCT No.: PCT/EP2008/058760

§ 371 (c)(1), (2), (4) Date: Jan. 21, 2010

(87) PCT Pub. No.: WO2009/015999

PCT Pub. Date: Feb. 5, 2009

(65) Prior Publication Data

US 2010/0192562 A1 Aug. 5, 2010

(30) Foreign Application Priority Data

Aug. 1, 2007 (DE) ........................ 10 2007 035 971

(51) Int. Cl.
*F16D 31/02* (2006.01)

(52) U.S. Cl.
USPC ................................. 60/463; 60/422; 60/452

(58) Field of Classification Search .................... 60/422, 60/450, 452, 462, 463, 484
See application file for complete search history.

(56) References Cited

U.S. PATENT DOCUMENTS 7,434,393 B2 10/2008 Hesse

FOREIGN PATENT DOCUMENTS

| | | |
|---|---|---|
| DE | 198 31 595 | 1/2000 |
| DE | 103 42 037 | 4/2005 |
| WO | 02/42648 | 5/2002 |
| WO | 2005/024245 | 3/2005 |

OTHER PUBLICATIONS

Data Sheet RD 64276 From Bosch Rexroth AG, Aug. 2008 (In English).

*Primary Examiner* — Michael Leslie

(74) *Attorney, Agent, or Firm* — Michael J. Striker

(57) ABSTRACT

A control system actuates at least two hydraulic consumers that may be supplied with pressure medium via a pump, in the case of which an electrically or electrohydraulically adjustable metering orifice (8) is situated in the pressure medium flow path to each of the consumers. The pressure medium flow to the consumer may be adjusted by the metering orifice. A device may adjust the pump pressure or the pumped quantity once a maximum load pressure in the supply line (22, 24) of a consumer has been reached, depending on the demand for pressure medium by one consumer or the other consumer.

11 Claims, 1 Drawing Sheet

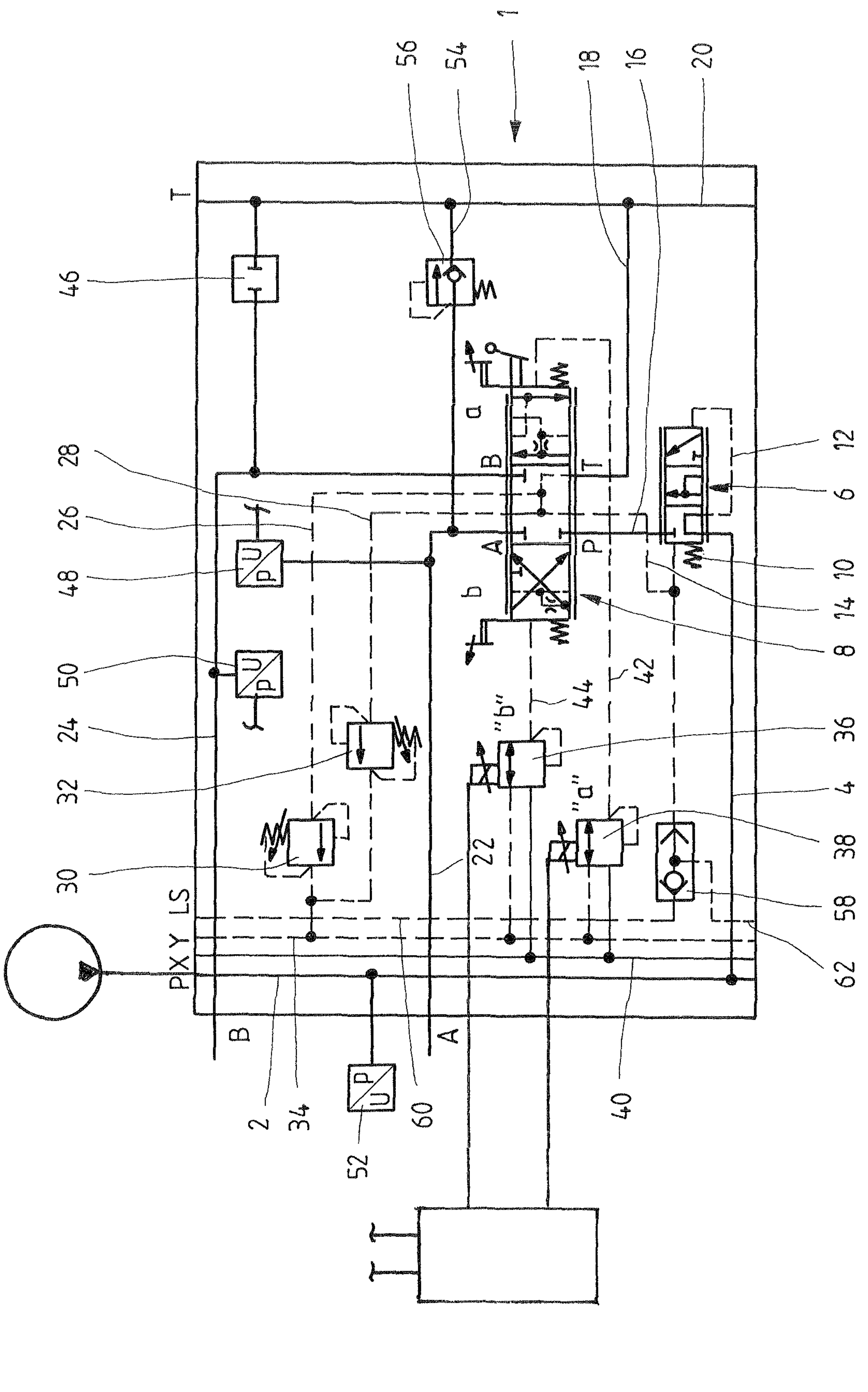
1
2
4
6
8
10
12
14
16
18
20
22
24
26
28
30
32
34
36
38
40
42
44
46
48
50
52
54
56
58
60
62
T
A
B
P
X
Y
LS
a
b
"a"
"b"

CONTROL SYSTEM AND METHOD FOR CONTROLLING AT LEAST TWO HYDRAULIC CONSUMERS

CROSS-REFERENCE

The invention described and claimed hereinbelow is also described in PCT/EP2008/058760, filed on Jul. 7, 2008 and DE 10 2007 035 971.5, filed on Aug. 1, 2007. This German Patent Application, whose subject matter is incorporated here by reference, provides the basis for a claim of priority of invention under 35 U.S.C. 119 (a)-(d).

The present invention relates to a control system for supplying pressure medium to at least two consumers and to a method for actuating the consumers.

Hydraulic systems are used to actuate a plurality of consumers, in the case of which the consumers are supplied with pressure medium via a common pump (a fixed-delivery pump having a bypass pressure regulator, or a variable-displacement pump). A metering orifice and a pressure regulator are provided in the pressure medium flow path between the pump and each consumer, via which the pressure medium flow to the consumer may be adjusted. A distinction is made between systems that operate according to the flow-regulating principle or the flow-dividing principle; in the case of the latter, the pressure regulator is always installed downstream of the metering orifice. These flow-dividing systems are also referred to as LUDV systems which are a subset of LS systems. In an LS system, the pump is adjusted as a function of the highest load pressure in the actuated hydraulic consumers in a manner such that the supply pressure is higher than the highest load pressure by a predetermined pressure difference.

In LUDV systems, the downstream pressure regulators are acted upon in the opening direction by the pressure after the particular metering orifice, and they are acted upon in the closing direction by a control pressure that typically corresponds to the highest load pressure of all actuated consumers. In a system of this type, if undersaturation occurs, the quantities of pressure medium flowing to the individual hydraulic consumers are reduced by the same ratio, independently of the particular load pressure on the hydraulic consumers (load-independent flow distribution).

In systems that operate according to the flow-regulating principle, the pressure regulator that is installed upstream or downstream of the metering orifice is acted upon in the closing direction by the pressure in front of the metering orifice, and it is acted upon in the closing direction by the load pressure downstream of the metering orifice, and therefore load-independent flow distribution is not attained. When a plurality of hydraulic consumers is actuated simultaneously, and the quantity of pressure medium delivered by the variable-displacement pump is insufficient (undersaturation), only the quantity of pressure medium flowing to the consumer having the highest load is reduced.

A system of that type is described, e.g., in data sheet RD 64 276 from Bosch Rexroth AG (control block M4-12).

Publication DE 103 42 037 A1 describes an EFM (Electronic Flow Matching) system, in which the metering orifices and the pump are adjusted electronically or electrohydraulically. In that case, the load pressure on the consumers is detected via sensors, e.g., pressure sensors, located in the pressure medium flow path to each of the consumers, and the consumer having the highest load pressure is identified based on the signals from the sensors. The metering orifice assigned to this consumer is then opened completely via a control unit, thereby minimizing the pressure loss via this metering orifice and, therefore, the pressure loss in the entire system.

If two or more consumers are actuated via the above-described control systems, and one of them hits a stop, then this consumer remains actuated, and pressure medium is pumped accordingly from the pump to the consumer. The pressure in the supply line to the consumer that has hit a stop is typically limited via a pressure-limiting valve that opens a pressure-medium connection to the tank, thereby enabling the excess pressure medium to be pumped to the tank.

In the case of the aforementioned M4-12 control block, the load pressure of all consumers is signaled via an LS channel, and it is then adjusted as a function of the load pressure, and therefore the pump pressure is above the highest load pressure by a predetermined pressure difference. The load pressure of the particular consumers is tapped via LS lines, and it is signaled to the LS channel via a cascade of shuttle valves. In the case of the M4-12 control block, an LS pressure-limiting valve is situated in each of the LS lines. The LS pressure-limiting valve assigned to the consumer that has hit the stop then limits the load pressure to a maximum load pressure, and so the pump is adjusted as a function of this maximum load pressure; the pump pressure is then regulated to the LS maximum pressure, plus the aforementioned pressure difference, and the pump is therefore adjusted to its maximum—although limited—delivery pressure. Accordingly, this maximum pressure in the pressure medium flow path to the other consumers must be throttled to the particular load pressure via the particular individual pressure regulators. A small flow of control oil drains to the tank via the pressure-limiting valve assigned to the consumer that has hit the stop.

Although a system of that type ensures that the quantity of pressure medium is reduced or limited if a consumer hits a stop, considerable energy losses result via the throttling of the pump pressure in the pressure medium flow path to the consumers having the smaller loads.

In the case of the LUDV systems described initially, which are used, e.g., in excavators in order to actuate the equipment, the pump delivery flow is limited or reduced via a pressure cut-off using a principle that is similar to the one described above, in order to prevent power losses. Likewise, in the case of LUDV systems that include pressure cut-off, the pressure medium flow to the consumers having the lower loads must be throttled at the individual pressure regulators.

SUMMARY OF THE INVENTION

In contrast, the object of the present invention is to create a control system and a method for actuating at least two hydraulic consumers, in which energy losses are minimized if a predetermined load pressure of the consumer having the highest load pressure is exceeded.

According to the present invention, an adjustable metering orifice is situated in each of the pressure medium flow paths to the consumers which are supplied with pressure medium via a pump, in order to adjust the pressure medium flow individually. The pump is adjusted as a function of the highest load pressure on the consumers such that the demand for pressure medium by all actuated consumers is fulfilled. According to the present invention, the load pressure of the individual consumers is monitored via a device, and, if a predetermined maximum load pressure is exceeded at one consumer, the pump pressure or pumped quantity is adjusted as a function of the demand for pressure medium of the other consumer, on which the load is lower, thereby ensuring that the throttling losses at these consumers are minimal compared to the solutions described initially. In the case of the system according to the present invention, if a consumer hits a stop or if a very high external load occurs, the energy loss in the circuit is minimized since the pressure level of the pump is reduced compared to the existing solutions.

According to the present invention, it is preferable for an LS or LUDV individual pressure regulator to be assigned to the metering orifice, thereby forming a control system that operates according to the flow-regulating principle or the flow-dividing principle.

In one embodiment of the present invention, the maximum load pressure of the control system is limited by LS pressure-limiting valves in the particular LS lines that carry the particular load pressure, and the above-described maximum load pressure therefore lies in the range of the maximum LS pressure set via the LS pressure-limiting valves.

In an embodiment having a particularly simple design, the device used to adjust the pump when the maximum load pressure is exceeded includes a pressure sensor for detecting the supply pressure, the output signal of which may be processed by a control unit into an actuating signal for actuating the assigned metering orifice.

It is preferable for the assigned metering orifice to be closed when the maximum load pressure is reached, thereby ensuring that the affected consumer is no longer supplied, thereby ensuring that only the load pressures in the other consumers, which have the lower loads, need to be considered in terms of pump regulation.

It is advantageous to design the device such that the load pressure signal of the consumer having the maximum load pressure may not be signaled into the LS channel.

If the intention is to design the control system as an EFM system, the pump is designed to be actuated in an electrical or electrohydraulic manner; in this case, a quantity signal for adjusting the pumps may be transmitted via the device to the pump.

This quantity signal may be generated, e.g., as a function of the signal for adjusting the metering orifice of the consumer having the highest load.

In EFM systems of that type, a pressure sensor for detecting the pump pressure may be provided in addition to the aforementioned pressure sensors which are used to detect the highest load pressure. The detected load pressures and the pump pressure are then compared to one another in a comparator unit, and, if this pressure difference is below a predetermined value, a control signal for closing the metering orifice of the consumer having the highest load, and for retracting the pump is output via the device.

The closing of the metering orifice may take place in a stepped manner (black-white), or in accordance with a characteristic curve.

The metering orifice is opened once the load pressure at this consumer, which has the highest load, has fallen below the maximum load pressure once more. It is preferable for the affected metering orifice not to be opened until the actual load pressure is below the maximum load pressure by a predetermined pressure difference. In this case, the system is designed with a certain “pressure hysteresis”.

The control system according to the present invention may be designed, e.g., as an LS system (pressure-regulating system), as an LUDV system (flow-dividing system), as an EFM system (LS and LUDV), or as an electrohydraulic, positive-control system (PC). In this system, the pivot angle of the pump is increased using the control signal, in order to adjust the metering orifice.

BRIEF DESCRIPTION OF THE DRAWING

FIG. 1 shows circuit diagram of an electrohydraulic directional-valve element of a mobile control block.

A preferred embodiment of the present invention is explained below in greater detail with reference to a drawing.

DETAILED DESCRIPTION OF THE PREFERRED EMBODIMENTS

This single drawing shows a circuit diagram of an electrohydraulic directional-valve element 1 of a mobile control block which is typically composed of an input element, a plurality of directional-control elements (mechanical, hydraulic, electrohydraulic), and an end element. Mobile control blocks of that type are described, e.g., in the above-described data sheet RD 64276 from Bosch Rexroth AG. A directional-control element may be assigned to each hydraulic consumer as shown in the FIGURE that is described below.

A directional-control element 1 of that type includes a pressure port P, a control oil supply X, a control oil return Y, an LS port LS, a tank port T, and two working ports A, B which are connected, e.g., to a cylinder chamber on the bottom side, and to an annular chamber, which is situated on the side of the piston rod, of a hydraulic cylinder. In the embodiment described below, an LS pump is connected to pressure port P, via which directional-control elements 1 of the control block are supplied with pressure medium. The LS pump is actuated in the manner described initially, as a function of the highest load pressure of all consumers, which is tapped via a cascade of shuttle valves at the mobile control block.

Pressure port P is connected to a pump channel 2 of directional valve 1, from which a supply channel 4 branches off. This leads to an inlet port of an individual pressure regulator 6 which, together with a proportionally adjustable displacement valve 8 which forms a metering orifice, forms a flow regulator. Pressure regulator 6 is preloaded via a pressure regulator spring 10 in its resting position which is assumed when the consumer connected to directional-control element 1 shown does not demand pressure medium, and directional valve 8 is switched into its home position which is shown. If pressure medium is demanded, pressure regulator 8 is displaced from the resting position shown into a control position, and the pressure upstream of directional valve 8 acts via a control line 12 in the closing direction, and the pressure downstream of the metering orifice, which is formed by directional valve 8, acts together with pressure regulator spring 10 on pressure regulator 6 in the opening direction. The pressure downstream of the metering orifice is tapped via LS line 14. The outlet of the pressure regulator is connected via a pressure regulator channel 16 to inlet port P of directional valve 8. This, in turn, includes two working ports A, B and a tank port T which is connected via a discharge channel 18 to a tank channel 20 which empties into tank port T. Working ports A, B are connected via a supply channel 22 and a return channel 24 to working ports A and B of the directional valve element.

In the home position of directional valve 8 shown, working ports A, B and pressure port P are blocked, and tank port T is connected to LS line 14 and two LS pressure-limiting channels 26, 28. LS pressure-limiting channel 26 is assigned to working port A, and LS pressure-limiting channel 28 is assigned to working port B of directional valve element 1. An LS pressure-limiting valve 30 and 32 is situated in each of the LS pressure-limiting channels 26, 28, respectively, via which the maximum load pressure present at consumer ports A, B is limited. LS pressure-limiting valves 30, 32 are adjustable, thereby making it possible to set different LS maximum pressures in the supply line and in the return line. The two outlets of LS pressure-limiting valves 30, 32 are connected to a control oil return channel 34 which is connected to control oil return Y.

Directional valve 8 is adjusted via two pressure-reduction valves 36, 38, to the inlets of which a control oil supply channel 40 is connected. The tank ports of pressure-reduction valves 36, 38 are connected to control oil return channel 34. The outlet pressure adjusted by pressure-reduction valve 36, 38 is guided via a control line 42 or 44 to the control surfaces—which are effective in directions a and b, respectively—of the directional control piston. Pressure-reduction valves 36, 38 are each actuated via a proportional magnet as a function of an actuating signal from the control unit. These actuating signals, which are used to adjust a control-pressure difference in order to adjust directional valve 8, may be specified, e.g., by the operator using a joystick, in order to actuate the consumer which is connected.

In the embodiment shown, return channel 24 is connected via a connecting channel to tank channel 20, but this connecting channel is blocked via a screw plug 46.

The pressure in supply channel 22 and in return channel 24 is detected via a pressure sensor 48, 50 in each case, and it is forwarded via signal lines, which are not depicted, to a control unit, which is likewise not depicted, of the mobile working device. In the embodiment shown, a further pressure sensor 52 is provided, via which the pump pressure in pump channel 2 is detected. Pressure sensor 52 is not absolutely necessary, however. However, an alternative pressure cut-off may be realized by using pressure sensor 52.

In the case of directional element 1, supply channel 22 is connected via a bypass channel 54 to tank channel 20. A pressure-limiting replenishing valve 56 is provided in bypass channel 54, via which pressure medium may be replenished from tank channel 20 in order to prevent cavitations from occurring, and via which pressure protection is provided in supply channel 22. A pressure-limiting replenishing valve 56 of that type may be used instead of screw plug 46, thereby also securing return channel 24 and allowing pressure medium to be replenished.

By adjusting a control pressure difference via pressure-reduction valves 36, 38, the valve spool in directional valve 8 may be moved out of its home position shown, toward the left, and into the positions labeled "a", in which pressure port P is connected via the opened metering orifice to working port A, and working port B is connected to tank port T. Moreover, in these positions labeled "a", a section of the pressure medium flow path situated downstream of the opened metering orifice is connected to LS line 14, thereby enabling this pressure (downstream of the metering orifice) to act on pressure regulator 6 in the opening direction. Furthermore, LS line 14 is connected to LS pressure-limiting channel 26 in the positions labeled "a", and therefore the load pressure in LS line 14 is limited to the value set at LS pressure-limiting valve 30. The pressure in LS line 14 is present at the inlet of a directional-control valve 58, the other inlet port of which is connected to a channel 60 that is connected to a further directional valve element, or to the tank. The outlet of directional valve 58 is connected via an LS channel 62 to the LS ports of the further directional valve elements of the remaining consumers or to the pump regulator, and therefore the highest load pressure is directed via a cascade of shuttle valves to the pump regulator. This pump regulator regulates the pump pressure in a manner such that it is always above the maximum load pressure by a predetermined pressure difference.

When directional valve element 1 is displaced, in the manner described above, into the position labeled "a", the pressure medium flows via working port A to the consumer, and, from there, via working port B to tank T; the pressure medium flow is held constant, independently of the load pressure, via the metering valve and upstream LS pressure regulator 6. In its regulating position, the LS pressure regulator holds the pressure drop constant via the metering orifice.

When directional valve element 1 is moved into its position labeled "b", pressure port P is connected to working port B, and working port A is connected to tank port T, and so, practically speaking, the channel which is referred to as supply channel 22 becomes the return channel, and the channel referred to as return channel 24 becomes the supply channel since the pressure medium flows via working port B of directional valve element 1 to the consumer, and, from here, via working port A to tank port T.

As in positions "a" described above, the pressure is tapped upstream of the metering orifice, which is controlled open between inlet port P and working port B of directional valve element 1, via LS line 14, and it is directed to the control surface—which is effective in the opening direction—of LS pressure regulator 6. LS line 14 is connected to LS pressure-limiting channel 28 in the positions labeled "b", and therefore the maximum load pressure is limited by LS pressure-limiting valve 32.

Directional control elements 1 of the other consumers have a similar design. It is assumed that a plurality of these consumers is actuated simultaneously via particular directional valve element 1, and that the load pressure of the consumer which is connected to directional valve 1 at working ports A, B is the highest load pressure in the system. The pump pressure is adjusted accordingly to be higher than this highest loaded pressure by the aforementioned pressure difference (20 bar). It is assumed that consumer port A is supplied with pressure medium, and therefore directional valve 8 must be displaced into its positions labeled "a". If the assigned consumer now hits a stop, the load pressure at working port A increases, and, therefore likewise in LS pressure-limiting channel 26 and in LS line 14. However, the load pressure is limited via LS pressure-limiting valve 30 to a maximum value that cannot be exceeded. Via pressure sensor 48, the increase in load pressure in supply channel 22 is detected, and, when a predetermined maximum pressure is reached, which approximately corresponds to the maximum load pressure set via the LS pressure-limiting valve, a control signal is transmitted via the control unit, which is not depicted, to pressure-reduction valves 36, 38, and so they close the metering orifice, and directional valve 8 is returned to its home position shown. This closing motion of directional valve 8 may be abrupt, or it may follow a characteristic curve (a ramp) having predefined characteristics. Once the metering orifice has closed completely, the load pressure signaled in LS line 14 also decreases, and therefore the pump regulation is dependent on the parallel consumers, which have lower loads, after directional valve 8 is closed. The highest load pressure of these parallel consumers, which have lower loads, is then signaled to the pump regulator, and the pump is adjusted to a correspondingly low value, and so the throttling losses at the consumers having lower loads are substantially lower than those associated with the related art described initially.

A similar control, in which the metering orifice assigned to the consumer having the highest load is closed, may also be implemented when an excessive external load occurs.

If the load pressure at the consumer that previously had the highest load drops once more below the maximum load pressure entered on the control device, directional valve 8 is returned to its setpoint position, and the assigned consumer is supplied with pressure medium once more.

When the consumer is actuated in the opposite direction, directional valve 8 is displaced into its positions labeled "b", and the pressure is detected via further pressure sensor 50; if the predetermined maximum load pressure is exceeded, the metering orifice is closed once more.

In an EFM system, the pump is not actuated as a function of the highest load pressure, but rather electrically via a characteristic curve of the pump, which is stored in the control unit, and via the proportional magnets in order to actuate pressure-reduction valves 38, 46. Pressure sensor 52 may be used in EFM systems of that type. It is thereby determined, via the control unit, with reference to the stored characteristic curves, and as a function of the pressures measured in pump channel 2 and in channels 22, 24, and with reference to the settings of the pressure-reduction valves, whether the mathematically calculated pressure drop over the metering orifice corresponds to the pressure drop that was measured. If this pressure drop is too low, and the pump pressure approximately corresponds to the load pressure, this is a reliable indication that the consumer has either hit a stop, or that the load is too high. In this case, the metering orifice is closed in the manner described above, and the pumped quantity is lowered electronically as a function of the demand for pressure medium by the consumer having the lower load. That is, the above-described control may be realized electrically or electrohydraulically.

In principle, LS, LUDV, EFM and PC systems having pressure sensors 48, 50 operate in the same manner. In the case of LS and LUDV systems, it is only necessary to retract the piston of directional valve 8, and in EFM and PC systems, it is also necessary to adjust the pumped quantity. If an additional sensor 52 is available, an alternative decision-making criterium may be used. This applies for all systems.

However, EFM systems may also be regulated in the manner according to the present invention without pressure sensor 52. This may be realized, e.g., by not using the original joystick signal to actuate the consumer as the input of the EFM calculation to close the metering orifice, but rather by using the reduced signal that is transmitted to pressure-reduction valves 36, 38 when the above-described maximum load pressure is reached. On the basis of this signal, the pump is then actuated with reference to the pump characteristic curve stored in the control unit, and as a function of the highest load pressure in the parallel consumers, in order to minimize the losses.

Disclosed herein is a control system and a method for actuating at least two hydraulic consumers, in which, when a predetermined maximum load pressure of one of the consumers is exceeded, the pump is actuated as a function of the demand for pressure medium by the other consumer, which has a lower load.

What is claimed is:

1. A control system for actuating at least two hydraulic consumers that may be supplied with pressure medium via a pump, wherein an electrically or electrohydraulically adjustable metering orifice (8) is situated in the pressure medium flow path to each of the consumers, via which the pressure medium flow to the consumer may be adjusted, wherein the pump pressure or the pumped quantity may be adjusted once a maximum load pressure in a supply line (22, 24) of a consumer has been reached, depending on the demand for pressure medium by one consumer or the other consumer, and wherein the supply pressure is detected by a pressure sensor (48, 50), the output signal of which may be processed by a control unit into an actuating signal for actuating the assigned metering orifice (8).

2. The control system as recited in claim 1, in which the load pressure of the consumers is tapped via an LS line (14; 26, 28) and signaled to an LS channel (62), and in which the pump pressure of the pump may be adjusted as a function of the load pressure in the LS channel (62).

3. The control system as recited in claim 2, in which an LS or LUDV individual pressure regulator (6) is assigned to the metering orifice.

4. The control system as recited in claim 2, in which an LS pressure-limiting valve (30, 32) is assigned to the LS line (14; 26, 28).

5. The control system as recited in claim 1, in which the metering orifice (8) may be closed once the maximum load pressure is reached.

6. The control system as recited in claim 5, in which the closing is carried out in accordance with a predetermined characteristic curve.

7. The control system as recited claim 1, in which the device is designed such that the load pressure signal of the consumer having the highest load pressure is not taken into account when the pump is actuated.

8. The control system as recited in claim 1, in which the pump is actuated electrically or electrohydraulically, and in which a quantity signal may be transmitted via the control unit to the pump in order to lower the pump pressure.

9. The control system as recited in claim 8, in which the quantity signal may be generated as a function of the signal for adjusting the metering orifice (8).

10. The control system as recited in claim 5, comprising a pressure sensor (52) for detecting the pump pressure, and a comparator unit for comparing the load pressure in the supply line (22, 24) and the pump pressure, and a device for emitting a control signal for closing the metering orifice (8) of the consumer having the highest load, and for retracting the pump when the pressure difference between the pump pressure and the load pressure is below a predetermined value.

11. The control system as recited in claim 1, in which it is designed as an LS or LUDV system, or as an EFM or positive-control system.

* * * * *